No. 676,172. Patented June 11, 1901.
W. I. AVERY.
WATER STILL AND CONDENSER.
(Application filed July 16, 1900.)
(No Model.) 2 Sheets—Sheet 1.

Witnesses: Inventor
Edward J. Dugan Washington Irving Avery
Frank B. Pfaffen

THE NORRIS PETERS CO., PHOTO-LITHO., WASHINGTON, D. C.

No. 676,172. Patented June 11, 1901.
W. I. AVERY.
WATER STILL AND CONDENSER.
(Application filed July 16, 1900.)
(No Model.) 2 Sheets—Sheet 2.

UNITED STATES PATENT OFFICE.

WASHINGTON IRVING AVERY, OF NEW YORK, N. Y., ASSIGNOR TO HARRIS B. MITCHELL, OF MALDEN, MASSACHUSETTS.

WATER STILL AND CONDENSER.

SPECIFICATION forming part of Letters Patent No. 676,172, dated June 11, 1901.

Application filed July 16, 1900. Serial No. 23,785. (No model.)

*To all whom it may concern:*

Be it known that I, WASHINGTON IRVING AVERY, a citizen of the United States, residing at New York, in the county and State of New York, have invented certain new and useful Improvements in Water Stills and Condensers, of which the following is a specification.

This invention relates to water stills and condensers; and it has for its object to provide a simple and improved device or apparatus of this class which will be comparatively inexpensive in construction and of high capacity and efficiency and which will effectively operate to thoroughly aerate the condensed water.

Figure 1:
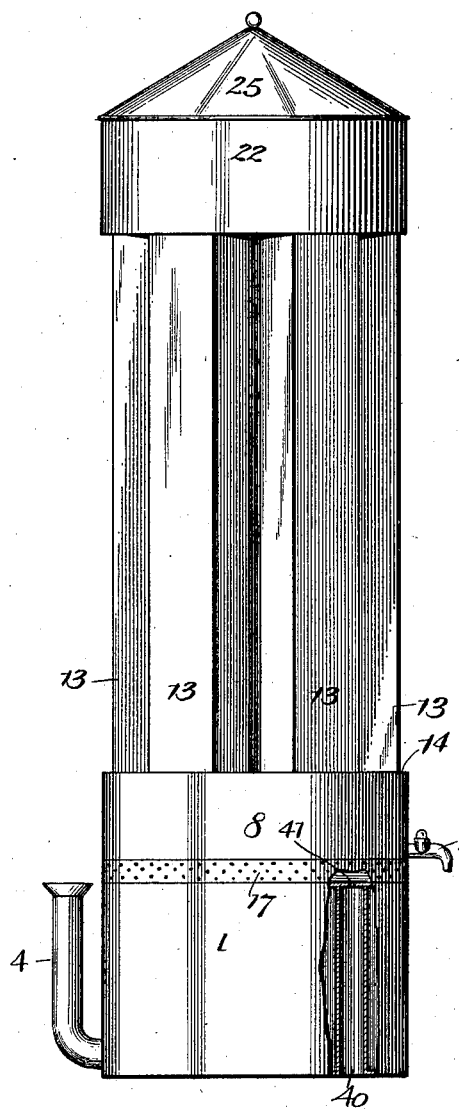
Figure 2:
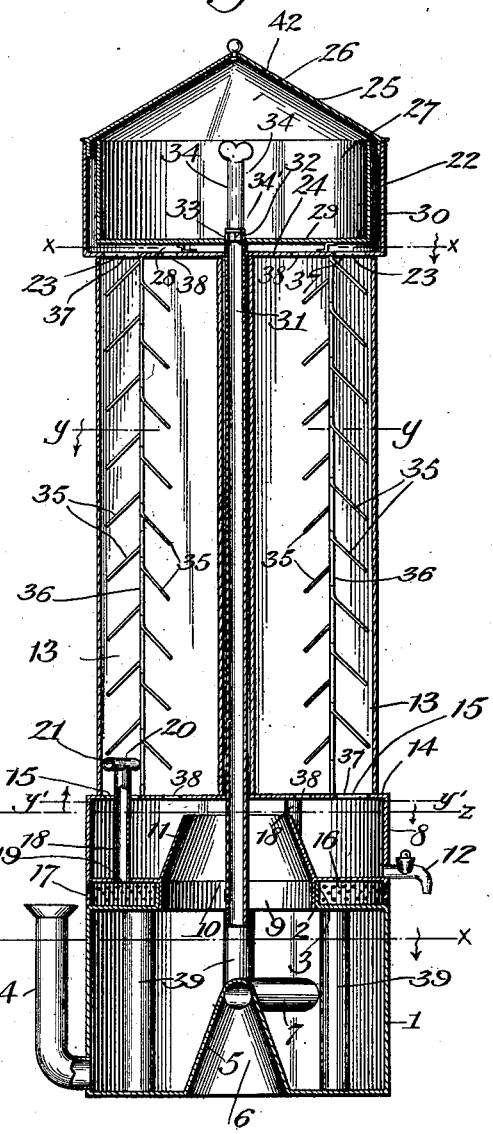

In the drawings forming a part of this specification, Figure 1 is a side view, partly in section, of my improved condenser. Fig. 2 is a vertical longitudinal sectional view. Fig. 3 is a top or plan view, the cover being broken away. Fig. 4 is a horizontal sectional view taken on the line $xx$, Fig. 2. Fig. 5 is a horizontal sectional view taken on the line $yy$, Fig. 2. Fig. 6 is a horizontal sectional view taken on the line $zz$, Fig. 2. Fig. 7 is a horizontal sectional view taken on the line $x'x'$, Fig. 2. Fig. 8 is a horizontal sectional view taken on the line $y'y'$, Fig. 2, and looking upwardly. Fig. 9 is a detail perspective view, partly broken away, of the valve means for controlling the automatic water-feed from the water-reservoir.

Corresponding parts in all the figures are denoted by the same numerals of reference.

Referring to the drawings, 1 designates a boiler which has a top opening 2, surrounded by an annular flange 3, and may be provided with a suitable inlet or feed tube, as at 4. This boiler is designed to contain the water to be distilled and purified and aerated, and it is adapted to rest upon a stove or other heating apparatus. In lieu of the boiler 1 an ordinary tea-kettle may be employed. To increase the heating efficiency of the boiler, it may be provided with a conical bottom, as shown at 5, forming a hot-air chamber 6, having at its apex radial outlet-tubes 7, extending to orifices 7ᵃ in the sides of the boiler.

8 designates a drum or chamber for the condensed water, which is supported upon the boiler 1 and detachably connected therewith by means of an annular flange 9, surrounding the bottom opening 10 of the drum and fitting within the flange 3 of the boiler. The drum is provided with a conical bottom 11, extending from the bottom opening 10 and forming a tube, which provides a convergent steam-outlet from the boiler, and the drum has a suitable faucet 12 for drawing off the distilled or condensed and purified water.

The drum 8 carries a set of vertical condensing-chambers 13, extending upwardly from the top 14 of the drum, which chambers are preferably arranged in an annular series, as shown, for purposes of strength and convenience and economy in space. The condensing-chambers communicate at their lower ends with the condensed-water drum by means of openings or perforations, as at 15, formed in the top 14 of the latter and arranged in radial series to intersect the condensing-chambers. The whole area of the lower end of the condensing-chambers may, if desired, open into the drum; but I prefer to employ the inlet perforations or openings 15, as shown, inasmuch as it is desirable to "cut up" the passage of the steam to facilitate condensation.

To effect thorough aeration of the condensed water, an air-inlet is provided in connection with the condensing-chambers. This air-inlet comprises a chamber 16, provided above the boiler and between the latter and the condensed-water drum in the space formed by the neck-flanges 3 and 9, the sides of said air-chamber being preferably formed of a foraminous or network flange 17, carried by the drum 8 and projecting downwardly therefrom. The provision of an initial air-chamber above the boiler and the inclosure of said chamber by foraminous or perforated sides causes sterilization of the air before its passage to the condensing-chambers, since the air must pass into the air-chamber through the foraminous sides and is initially heated by reason of the location of said chamber just over the boiler. The air-chamber 16 communicates with the condensing-chambers 13 by means of vertical tubes 18, passing through the drum 8 and having their lower ends opening through the portion 19 of the bottom of the drum which surrounds the steam-entrance cone 11, while their upper ends project through the perforations 15 in the top 14 of the drum and into the lower portion of the condensing-chambers, the air being thus further initially introduced to the condensing-chambers at a high temperature and sterilized by reason of the contact of said feed-tubes 18 with the condensed water in the drum 8. At their upper ends the tubes 18 are extended laterally and horizontally, as at 20, and open laterally within the condensing-chambers, as at 21, whereby passage of the condensed water into said air-inlet tubes is precluded.

Upon the top of the series of condensing-chambers 13 is mounted a steam-chamber 22, with which the upper ends of the condensing-chambers communicate, preferably by means of openings or perforations 23, formed in the bottom 24 of the top chamber 22 and arranged in radial series to intersect the condensing-chambers. A suitable detachable cover, as at 25, is provided for said top chamber and is preferably dome-shaped, so that it forms interiorly a dome-space 26 at the top of the chamber 22 for the steam. Within the chamber 22 is arranged a water-reservoir 27, the relative construction and arrangement being such that a space, as at 28, exists between the bottom 29 of the reservoir 27 and the bottom 24 of the chamber 22 and also between the sides or walls of the reservoir 27 and chamber 22, as at 30, which spaces provide a passage for the steam from the condensing-chambers 13 around the reservoir 27 and to the dome-space 26. The reservoir 27 is designed to contain feed-water for supplying the boiler, and in operation this feed-water will be initially heated and also partially supplied with condensed water before feeding to the boiler, and it is aerated by action of the steam and sterilized air in the chamber 22 and dome-space 26. A feed-pipe 31 extends from the reservoir 27 downwardly and through the condensed-water drum 8 and air-chamber 16 and into the boiler 1, said pipe being preferably centrally arranged, so that it is central with respect to the series of condensing-chambers 13 and passes through the bottom opening of the condensed-water drum and through the top opening of the boiler. It will be understood that the water will automatically feed by gravity through the vertical pipe 31 from the reservoir 27 to the boiler, and suitable valve means are provided to control and regulate this feed of the water so that the automatic feed of water to the boiler will correspond to the amount condensed and deposited in the drum 8. The valve-control may consist of an extension, as at 32, of the top end of the pipe 31 above the bottom of the reservoir 27, the wall of which extension may have an inlet slit or slot, as at 33, and said extension receives a tubular key-piece 34, extending above the level of the water in the reservoir and having in its wall a slit or slot, as at 34', adapted to register with the slit or slot 33.

To augment the deflection of the passage of the steam upwardly in the condensing-chambers 13, whereby condensation is facilitated, I provide laterally-projecting or downwardly curved or turned blades or wings 35, carried upon a strip or rod 36, mounted in a vertical and longitudinal position within the condensing-chamber 13. The strip and its blades may be effectively formed of "scrap-tin" simply cut and turned to produce curved deflecting-blades.

It will be noted that the bottom and top openings, whereby the condensing-chambers communicate, respectively, with the condensed-water drum and the top steam-chamber, are preferably of varying size or diameter, the outer openings being relatively larger, as represented at 37, than the inner openings, as represented at 38, Fig. 8. The result of this structure in practical operation is that the heated steam will rush quickly upward in the condensing-chamber and out at the inner smaller opening 38, immediately under and against the bottom of the feed-water reservoir, thus highly heating the water in said reservoir, and the wet steam will be quickly condensed in the condensing-chamber. The heated and wet steam are thus effectively separated, which quickens the action of the condenser, and the quick upward rush of the hot steam draws the air and thoroughly causes full and complete aeration. Furthermore, the upward rush of the hot or superheated steam against the bottom of the top water-reservoir, as above mentioned, will so highly heat the water in said top reservoir that the same will generate steam and condense, and a double condensation action is thus secured both at the bottom of the device from the boiler 1 and at the top of the device from the feed-water reservoir.

The boiler 1 may, if desired, be provided with a set of vertical flues, as at 39, Fig. 2, arranged in circular series surrounding the central cone and open at the bottom, as at 40, the top end of said flues having a vent-opening 41 at the top of the boiler, by which construction the heating capacity of the boiler is enhanced and rapid action and economy in the heating medium are insured.

In the top dome may be provided an air-vent, as at 42.

In operation the steam generated in the boiler passes through the cone 11 into the drum 8 and through the openings 15 into the condensing-chambers 13, and the steam is cooled by the atmospheric air surrounding said chambers. The steam also passes from the condensing-chambers 13 through the openings 23 to the top steam-chamber 22 and is cooled by the atmospheric air in contact with said chamber 22 and its dome-top 25. The top reservoir also operates to generate steam in the dome-top 25. The products of condensation in the form of thoroughly-purified water trickle or flow back through the condensing-chambers and are accumulated in the reservoir drum or receptacle 8, as will be readily understood. The action of the steam in its upward passage draws air into the air-chamber 16, where it is sterilized by the heat from the boiler, and into the condensing-chambers and top steam-chamber 22, wherein the air is further sterilized by contact with the steam, thus effecting a thorough admixture of a large quantity of sterilized air with the steam, which not only accelerates condensation, but also thoroughly aerates the purified water resulting from condensation.

The relative construction and arrangement of my improved apparatus are such that a quick action in condensation and consequent high or maximum capacity are insured.

The still may be supported on a suitable perforated ring or on legs, so that when placed upon a stove air will circulate beneath the same.

Having thus described my invention, I claim as new and desire to secure by Letters Patent—

1. In combination a boiler, a condensed-water chamber mounted thereon, a series of condensing-water chambers, an air-space open to the atmosphere, and air-passages leading from said space to each of the condensing-chambers, and means to prevent the condensed water from entering said passages.

2. In combination a boiler, a condensed-water chamber mounted thereon, an air-chamber opening to the atmosphere separating the top of the boiler and the bottom of the condensed-water chamber, a series of condensing-chambers, and pipe connections leading from said air-chamber to each condensing-chamber and means to prevent the water of condensation from entering said pipes.

3. In combination a boiler, a condensed-water chamber, a series of condensing-chambers retarding-wings therein, means for supplying air to said chambers on one side of said retarders, large steam-openings leading to said chambers on the same side of the retarders as the air-supply, and small steam-supply openings leading to the chambers on the opposite side of the retarders, the steam-inlet therethrough having an unobstructed passage through the condensing-chambers whereby said air and steam fed to the other side of the retarders will be drawn through the latter, substantially as described.

4. The combination in a cylindrical water still and condenser, with the boiler and condensed-water chamber, of a series of vertically-arranged condensing-chambers having side walls radiating toward the center of the still forming chambers triangular in cross-section, a strip, having deflecting-wings, extending longitudinally of each condensing-chamber centrally thereof, a large steam-inlet in the bottom of each chamber into the front or enlarged portion thereof and contracted steam-inlet in the bottom of each chamber leading into the rear or contracted portion of each chamber, substantially as described.

5. The combination with a still having a cylindrical condensed-water chamber and a boiler beneath the same, of a series of condensing-chambers mounted upon the top of said condensed-water chamber and in communication with the same, each of said chambers being triangular in cross-section, the base of the triangle being substantially coincident with the periphery of the condensed-water chamber and the sides thereof radiating toward the center of the still, substantially as described.

6. In a condenser, a boiler, a condensed-water drum above the boiler and in communication therewith, a series of vertical condensing-chambers carried upon and communicating with the drum, an air space or chamber between the boiler and drum, a foraminous or perforated outer wall for said air-chamber, and tubes extending from the air-chamber through the drum to the condensing-chambers.

7. In a condenser, a series of vertical condensing-chambers, a steam-chamber above the same and in communication therewith, the water of condensation draining from the former into the latter, and a feed-water reservoir arranged in said steam-chamber, for the purpose set forth.

8. In a condenser, a boiler, a condensed-water drum above the same and in communication therewith, a series of vertical condensing-chambers extending above the drum and in communication therewith, a steam-chamber above the condensing-chambers and in communication therewith, a feed-water reservoir arranged in said steam-chamber, and a tube extending downwardly from said reservoir to the boiler.

9. In a condenser, a boiler, a condensed-water drum, a series of condensing-chambers extending above the drum and in communication therewith, a feed-water reservoir mounted above said condensing-chambers, and an axially-arranged tube extending downwardly from said reservoir to the boiler.

10. In a condenser, a boiler having a top opening with an upwardly-projecting flange, a condensed-water drum having a bottom opening with a downwardly-projecting flange fitting the flange of the boiler, said connecting projecting flanges forming an air space or chamber between the top of the boiler and bottom of the drum, and a foraminous or perforated outer wall for said air space or chamber.

11. In a condenser, a boiler having an open top and a conical bottom portion and radial flues intersecting the top of the cone.

12. In a condenser, vertical condensing-chambers having steam-inlets and condensed-water outlets at their bottom, and air-inlet tubes entering upwardly through the bottom of the condensing-chambers and having lateral outlets at their top ends into said chambers.

13. In a condenser, a boiler, a condensed-water drum above the same, an air-space being provided between the top of the boiler and bottom of the drum and open to the atmosphere, a series of vertical condensing-chambers carried upon the drum and in communication with the drum and boiler, and air-feed tubes extending from said air-space upwardly through the drum and entering the lower ends of the condensing-chambers.

14. In a condenser, vertical condensing-chambers, a top steam-chamber to which the upper ends of the condensing-chambers open, and a water-reservoir mounted in said steam-chamber with its bottom above said communicating upper ends of the condensing-chambers, for the purpose set forth.

15. In a condenser, a condensed-water drum, vertical condensing-chambers carried upon said drum and in communication therewith, and a top steam-chamber above said condensing-chambers, the condensing-chambers being in communication with the steam-chamber through openings of varying diameter, for the purpose set forth.

16. In a condenser, vertical condensing-chambers, a top steam-chamber to which the upper ends of the condensing-chambers open, and a water-reservoir mounted in said steam-chamber.

In testimony whereof I have signed my name in the presence of the subscribing witnesses.

WASHINGTON IRVING AVERY.

Witnesses:
EDW. J. DEEGAN,
D. H. GRAHAM.